United States Patent
Liu

(10) Patent No.: US 11,113,617 B1
(45) Date of Patent: Sep. 7, 2021

(54) RANKING OF USER CONTACTS TO FACILITATE EFFICIENT USER INTERFACES

(71) Applicant: Facebook, Inc., Menlo Park, CA (US)

(72) Inventor: Xiangyang Liu, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 554 days.

(21) Appl. No.: 16/003,260

(22) Filed: Jun. 8, 2018

(51) Int. Cl.
*G06N 7/00* (2006.01)
*G06F 16/2457* (2019.01)

(52) U.S. Cl.
CPC ....... *G06N 7/005* (2013.01); *G06F 16/24578* (2019.01)

(58) Field of Classification Search
CPC .......................... G06F 16/24578; G06N 7/005
See application file for complete search history.

(56) References Cited

U.S. PATENT DOCUMENTS

| | | | |
|---|---|---|---|
| 2004/0205134 A1* | 10/2004 | Digate | H04L 67/24 709/206 |
| 2006/0209690 A1* | 9/2006 | Brooke | G06Q 10/109 370/230 |
| 2008/0243789 A1* | 10/2008 | Kussmaul | G06Q 10/00 |
| 2009/0104895 A1* | 4/2009 | Kasturi | H04M 1/2746 455/414.1 |
| 2012/0191777 A1* | 7/2012 | Iwasaki | G06Q 10/101 709/204 |
| 2015/0278221 A1* | 10/2015 | Perry, III | G06Q 50/01 707/748 |
| 2017/0099240 A1 | 4/2017 | Evnine et al. | |
| 2017/0134329 A1* | 5/2017 | Edgar | H04L 51/26 |
| 2018/0089578 A1* | 3/2018 | Yadav | G06Q 10/10 |
| 2019/0102393 A1* | 4/2019 | Horling | G06F 16/24578 |

* cited by examiner

*Primary Examiner* — Scott A. Waldron
(74) *Attorney, Agent, or Firm* — Fenwick & West LLP

(57) ABSTRACT

A request for a ranked list of contacts of the user is received from a client device associated with a user. The request identifies a purpose for the ranked list of contacts. A list of the user's contacts is retrieved from a data store and a subset of the user's contacts that are likely to interact with the user in a specified future time period is identified. Ranking scores are calculated for the subset of the user's contacts, each ranking score indicating a probability that the user will interact with a corresponding one of the subset of the user's contacts in a manner consistent with the purpose. A ranked list of contacts is determined based on the ranking scores and sent to the client device.

20 Claims, 7 Drawing Sheets

RANKING OF USER CONTACTS TO FACILITATE EFFICIENT USER INTERFACES

BACKGROUND

This disclosure relates generally to providing functionality in a shared computing environment, and more particularly to ranking contacts of users within the computing environment.

Online systems provide services through which multiple users can interact and/or collaborate in various ways using applications. A wide array of applications are available for performing a wide range of functions. For example, messaging applications enable users to communicate, social network application enable users to share status updates and other forms of media, event planning applications help users organize events, and the like. Such applications often enable users to store lists of other users as contacts to enable continued interaction without having to search through all users of the application to find the desired individual.

Users use client devices, such as smartphones, to execute these applications. Such devices often have relative small screens but users often have large contacts lists. For example, users may have over one thousand contacts. Consequently, a problem arises because a device may only be able to show a few of the user's contacts at a time. This drawback hinders usage of the application because a user might still find it difficult to find a particular contact.

Machine learning may be used to train a model that identifies which contacts the user is most likely to engage with using a particular application at a particular time. However, such a model is computationally expensive. Furthermore, users may have different preferences for which contacts they interact with through different applications. Where a user has a large number of contacts, using such a model may become impractical.

SUMMARY

The above and other issues are addressed by a system that ranks a user's contacts based on likelihoods that the user will interact with the contacts. The ranking is performed in two or more phases, which may improve the overall efficiency of the process. In various embodiments, the ranking includes a global ranking phase and a specific ranking phase. The global ranking phase uses a global ranking model that efficiently identifies a subset of the user's contacts (e.g., three to five hundred contacts) with which the user is likely to interact in a given time period (e.g., the next day). The global ranking may be independent of the specific application through which the user will interact with the contacts.

The specific ranking phase applies a context-specific model that ranks the subset of the user's contacts based on the likelihood that the user will engage with the contacts with a particular application. The context-specific model may be a computationally more expensive model that considers signals specific to the particular application. Note that although the term application is used for convenience, in some embodiments, a single application may provide multiple functions, and a different refined model may be used for each function. In some embodiments, the ranking process includes additional phases. For example, the global ranking phase may be preceded by an initial ranking phase that identifies an initial subset of the user's contacts (e.g., 800 contacts) to which the global ranking process is applied.

In one embodiment, the ranking process includes receiving a request for a ranked list of contacts of the user from a client device associated with a user. The request identifies a purpose for the ranked list of contacts. The ranking process also includes retrieving a list of the user's contacts from a data store and identifying a subset of the user's contacts that are likely to interact with the user in a specified future time period is identified. The process further includes calculating ranking scores for the subset of the user's contacts, each ranking score indicating a probability that the user will interact with a corresponding one of the subset of the user's contacts in a manner consistent with the purpose. A ranked list of contacts is determined based on the ranking scores and sent to the client device.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
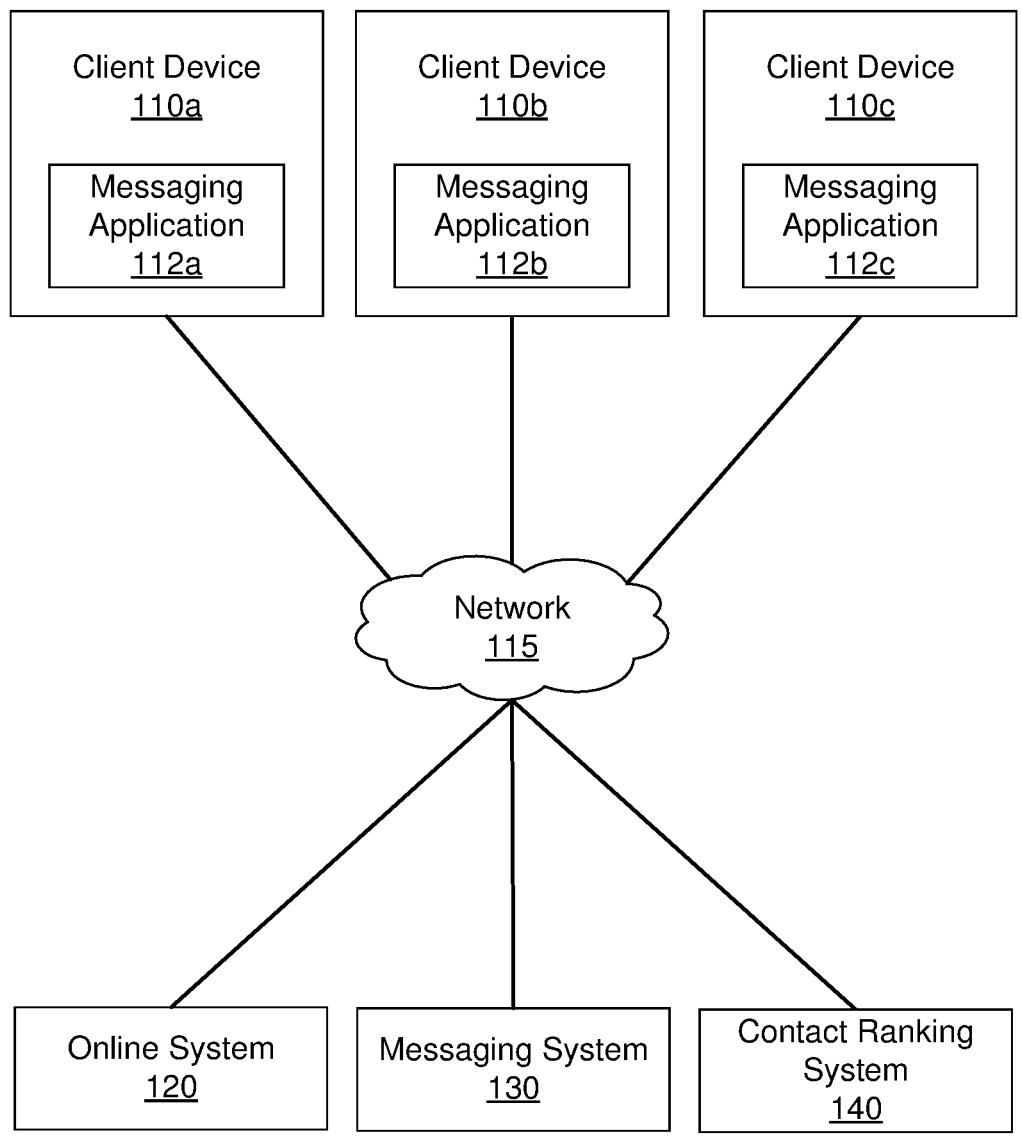
FIG. 1 is a block diagram of a system environment including a contact ranking system, in accordance with an embodiment.

FIG. 1 is a block diagram showing one embodiment of a system environment 100 in which functionality is provided to users via client devices 110. The system environment 100 shown by FIG. 1 includes one or more client devices 110, an online system 120 (e.g., a social networking system), a messaging system 130, and a contact ranking system 140, all connected via a network 115. While only a few client devices 110 and one messaging system 130 are shown in FIG. 1, the environment 100 can have many such entities connected to the network 115. In alternative configurations, different and/or additional components may be included in the system environment 100.

FIG. 1 uses like reference numerals to identify like elements. A letter after a reference numeral, such as "110a," indicates that the text refers specifically to the element having that particular reference numeral. A reference numeral in the text without a following letter, such as "110,"

refers to any or all of the elements in the figures bearing that reference numeral. For example, "110" in the text refers to reference numerals "110a," "110b," and/or "110c" in the figures.

A client device 110 is a computing device that can transmit and/or receive data via the network 115. A user may use the client 110 device to perform functions such as exchanging messages using the messaging system 130, interacting with the online system 120, browsing websites on web servers on the network 115, consuming digital content received via the network, and executing software applications. For example, the client device 110 may be a smartphone or a tablet, notebook, or desktop computer. In addition, the client device 110 may be an Internet-of-Things (IoT)-connected device such as a home appliance. The client device 110 may include a display device on which the user may view digital content, such as messages received from the messaging system 130.

The client device 110 may execute one or more applications ("apps") that extend the functionality of the client device. The apps may include a web browser that allows the client device 110 to interact with websites provided by servers connected to the network 115. The apps may also include one or more dedicated apps for accessing the online system 120 and/or the messaging system 130. For example, in FIG. 1, each client device 110 contains a messaging application 112. In one embodiment, the user downloads and installs apps on the client device 110 for specific purposes, such as exchanging messages using the messaging system 130. Alternatively, the functionality of an app may be incorporated into an operating system of the client device 110 or included in other native functionality of the client device.

The messaging application 112 illustrated within the client device 110 in FIG. 1 represents an application for interacting with the messaging system 130 via the network 115. The messaging application 112 enables a user of the client device 110 to exchange messages with other client device users. The messaging application 112 maintains a list of contacts on behalf of the user. The contact list includes contact information about other client device users with whom the user can use the messaging system 130 to communicate. The contact information may include, for example, names, electronic and physical addresses, telephone numbers, pictures, and notes.

The messaging application 112 shows a graphical representation of the user's contacts list on a display device of the client device 110. The graphical representation identifies at least some of the user's contacts and is displayed in a portion of a graphical user interface (GUI) of the messaging application 112. The graphical representation includes information identifying contacts (i.e., other users). In one embodiment, the user's contacts are filtered to display those who are currently using the messaging system 130 (those contacts who are active now). Alternatively, currently active users may be identified in the context list with an indicator (e.g., a green check mark next to the user's name).

The messaging application 112 may display the graphical representation of the user's contacts list in a variety of ways. For example, the graphical representation may be displayed in a dedicated area of the GUI showing a list of names and pictures of contacts. Typically, the number of contacts exceeds the amount of space in the GUI. Consequently, the portion of the GUI that includes the graphical representation of the user's contacts may be scrollable or otherwise navigable to allow the user to review the entire list of contacts. Requiring the user to scroll or otherwise delve deeper into the GUI in order to discover contacts is burdensome and hinders usage of the messaging application 112.

Accordingly, an embodiment of the messaging application 112 displays the contacts based on contact rankings (e.g., a ranked list of contacts generated by the contact ranking system 140). The highest-ranked contacts may be displayed first in the active now unit (e.g., at the top of the user's contacts list), such that these contacts are visible in the messaging application 112 without requiring the user to navigate through other users in the list. Various processes for ranking a user's contacts are described in greater detail below, with reference to the contact ranking system 140.

The client devices 110 may provide other functionality for which ranking a user's contacts is desirable. For example, as well as messaging, a client device 110 may enable the user to interact with contacts by sharing images and/or videos, organizing events, playing multiplayer games, and the like. In each instance, the operation of the client device 110 may be made more efficient by automatically presenting contacts to the user with which the user is most likely to interact in a particular manner (e.g., by showing the user contacts with which the user usually plays games when starting a new game session and showing the user contacts with which they regularly share photos when sharing a photo, etc.). Such functionality may be provided within the messaging application 112 and/or by separate apps running on the client device 110. For convenience and clarity, this disclosure describes embodiments of the contact ranking process mostly by reference to use within a messaging application 112. However, one of skill in the art will recognize how the same or similar processes may be applied in other contexts where a ranked list of contacts is desirable.

The online system 120 supports interactions among users of the client devices 110. The online system 120 is remote from the client devices 110 and may be implemented using one or more dedicated computers and/or a cloud computing platform. These interactions may include exchanging and viewing content, ecommerce transactions, and messaging. The content provided by the online system 120 includes pages associated with users. A page provides information about users, including demographic information such as age, location, occupation, education, gender, relationship status, and others. The online system may also store information on a user's relationships with other users of the online system in the form of a list of friends and family. This information can be transmitted via the network 115.

The messaging system 130 interacts with the messaging applications 112 of the client devices 110 to support the exchange of electronic messages among the users of the devices. The messages can include text, images, audio, video, external links, and other content. As with the online system 120, the messaging system 130 is remote from the client devices 110 and may be implemented using one or more dedicated computers and/or a cloud computing platform.

In one embodiment, the messaging system 130 stores contact lists and message threads between users from the messaging applications 112. A message thread is a collection of messages exchanged between a set of two or more users. All of the messages exchanged between a set of users may form a single thread or the messages may be broken up into multiple threads (e.g., based on user input indicating when to start a new thread, time between messages being sent, or any other indicator of a break in the thread).

The messaging system 130 also extracts features from the threads. In one embodiment, the features for a thread include a number of messages feature and a number of days alive feature. The number of messages feature is a value describing the total number of messages in the thread (e.g., sent by user in the thread). The number of days alive feature is a value describing the number of instances of a given time period (e.g., a day) within a longer time period (e.g., the last seven days) in which a message was added to the thread. The features for a thread may also include demographic features of the users involved in the thread (e.g., age, location, etc.).

The contact ranking system 140 generates a ranked list of users from a user's contacts. The ranked list may include a subset of the user's contacts (e.g., one hundred) and corresponding ranking scores. In one embodiment, the contact ranking system 140 generates a subset of a user's contacts based on a likelihood that the user and the contacts will interact in a first time period (e.g., the next week). The contact ranking system 140 refines the subset with a global ranking model that generates likelihoods that the user and the subset of contacts will interact in a second time period that is shorter than the first time period (e.g., the next day). The refined subset of contacts is then ranked by applying a context-specific ranking model. The context-specific ranking model may be selected from a set of models that are configured to provide customized rankings to different applications. For example, in the case where the messenger application 112 requests the ranked list, a messenger-specific ranking model might be used that tanks the contacts based on likelihoods that the user will send a message to each contact. In some embodiments, the context-specific models are identified by model IDs so that other applications can identify which model should be used when making a request for a ranked contacts list.

In some embodiments, the contact ranking system 140 is remote from the client devices 110 and may be implemented using one or more dedicated computers and/or a cloud computing platform. Although the contact ranking system 140 is shown as a distinct entity in FIG. 1, it may also be integrated into another system, such as the online system 120 or the messaging system 130. Further details of the contact ranking process and embodiments of the contact ranking system 140 are described in greater detail below, with reference to FIG. 5.

The network 115 comprises any combination of local area and/or wide area networks, using both wired and/or wireless communication systems. In one embodiment, the network 115 uses standard communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2:
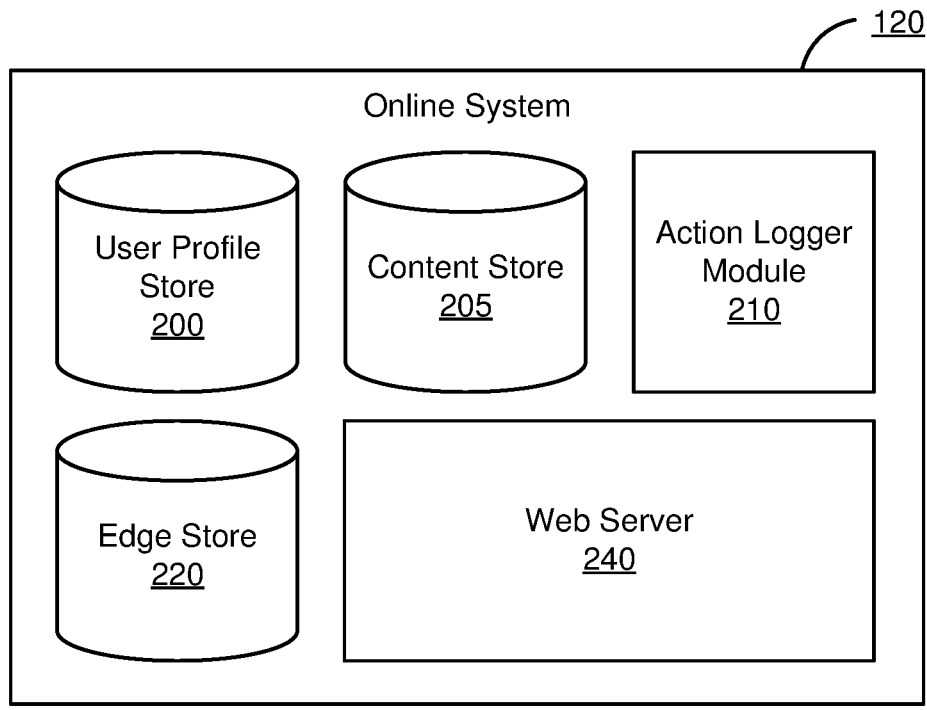
FIG. 2 is a block diagram of an architecture of the online system shown in FIG. 1, in accordance with an embodiment.

FIG. 2 is a block diagram of an architecture of the online system 120 according to one embodiment. The online system 120 shown in FIG. 2 includes a user profile store 200, a content store 205, an action logger module 210, an edge store 220, and a web server 240. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 200. A user profile includes declarative information about the user that was explicitly shared by the user and may also include profile information inferred by the online system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action logger module 210.

While user profiles in the user profile store 200 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system 120 using a brand page associated with the entity's user profile. Other users of the online system 120 may connect to the brand page to receive information posted to the brand page or to receive information from the brand page. A user profile associated with the brand page may include information about the entity itself, providing users with background or informational data about the entity.

The content store 205 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 205, such as status updates, photos tagged by users to be associated with other objects in the online system 120, events, groups or applications. In some embodiments, objects are received from third-party applications or third-party applications separate from the online system 120. In one embodiment, objects in the content store 205 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

The action logger module 210 receives communications about user actions internal to and/or external to the online system 120, populating an action log with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log.

In one embodiment, the edge store 220 stores information describing connections between users and other objects on the online system 120 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 120, such as expressing interest in a page on the online system 120, sharing a link with other users of the online system 120, and commenting on posts made by other users of the online system 120. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object.

The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 220 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Multiple interactions between a user and a specific object may be stored as a single edge in the edge store 220, in one embodiment. Alternatively, each interaction between a user and a specific object is stored as a separate edge. In some embodiments, connections between users may be stored in the user profile store 200, or the user profile store 200 may access the edge store 220 to determine connections between users.

The web server 240 links the online system 120 via the network 115 to the one or more client devices 110, as well as to the one or more third party systems. The web server 240 serves web pages, as well as other content, such as JAVA®, FLASH®, XML and so forth. The web server 240 may receive and route messages between the online system 120 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 205. Additionally, the web server 240 may provide application programming interface (API) functionality to send data directly to native client device operating systems.

Figure 3:
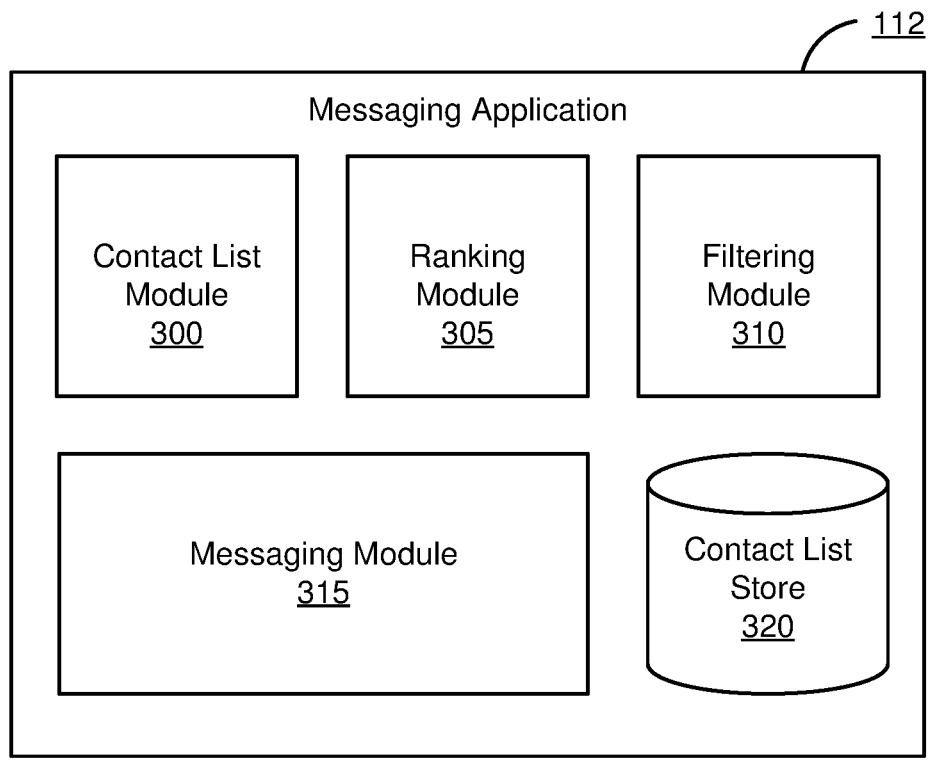
FIG. 3 is a block diagram of an architecture of the client messaging application shown in FIG. 1, in accordance with an embodiment.

FIG. 3 is a block diagram illustrating one embodiment of a messaging application 130. The messaging application 112 shown in FIG. 3 includes a contact list module 300, a ranking module 305, a filtering module 310, a messaging module 315, and a contact list store 320. In other embodiments, the messaging application 112 contains different and/or additional elements. In addition, the functions may be distributed among the elements in a different manner than described. For example, some embodiments may omit the filtering module 310.

The contact list module 300 manages a contact list for a user of the messaging application 112. The contact list may be derived from information entered manually by the user, from information stored on the client device 110, and/or from information stored by the online system 120. For example, the contact list may be formed of phone or email contacts imported from data stored on the client device 110. In another example, the contact list may be formed by retrieving information about connections associated with the user from the online system 120.

For each contact, the contact list module 300 stores identifying information (e.g., in the contact list store 320), such as a name, a phone number, and/or an identifier used by the messaging system 130. In one embodiment, the contact list module 300 transmits the contact list to the messaging system 130 when the messaging application 112 is first accessed by the user, and then sends delta updates to the messaging system 130 as the list changes over time. In some embodiments, the messaging application 112 uses the information in the contact list to gather demographic or biographic information from the online system 120.

The ranking module 305 obtains a ranked subset of the contacts in the user's contact list based at least in part on likelihoods that the user will interact with those contacts within a given time period (e.g., the next day). In one embodiment, the ranking module 305 sends a request for a ranked list of contacts to the contacts ranking system 140. The request may include the user's contacts (e.g., as stored in the contact list store 320). Alternatively, where the user's contacts are already stored remotely from the client device 110, the request may include an identifier of the user (e.g., a user ID) and not include the user's contacts. The ranking module 305 may then user the user ID to look up the user's contacts. The request also includes an indication of the purpose for which the ranked list is being requested. The purpose identifies a way in which the user may wish to interact with one or more contacts. In this case, the purpose is for selecting one or more contacts in the messenger application 112 to send a message. However, as noted previously, a ranked list of contacts may be desirable for other purposes, such as for the user to share media items, invite to attend an event, ask to play a multiplayer game, or the like.

The contact ranking system 140 returns the ranked subset of contacts to the ranking module 305. In one embodiment, the ranked subset of contacts includes a fixed number of contacts (e.g., one hundred) that the contact ranking system 140 are currently the most highly ranked in the context of the indicated purpose (in this case, displaying contacts in a portion of the GUI of the messaging application whom the user is most likely to select to interact with through the messaging application). The contact ranking system 140 may return the ranked subset with an indicator of rank (e.g., a rank number) and/or a rank score (in which case, the ranking module 305 ranks the contacts in the subset based on the rank score such that contacts with a higher rank score are ranked higher). Contacts with no scores may be ranked below the contacts with scores or excluded from the ranked list.

The filtering module 310, in embodiments where it is included, identifies which contacts in the ranked list are active now. The filtering module 310 receives the ranked contact list from the ranking module 305. In one embodiment, the filtering module 310 communicates with an active now service (not shown) via the network 115 to receive a list of currently active contacts. The filtering module 310 uses the list of currently active contacts to filter the ranked contact list. The filtering removes contacts that are not currently active from the ranked contact list to produce a ranked contact list containing only contacts that are active now. In other embodiments, the filtering module 310 identifies which contacts are currently active in other manners (e.g., by sending a request to client devices 110 of the contacts for a current activity status).

The messaging module 315 displays the ranked (and filtered if filtering is used) contact list to the user of the messaging application 112. In one embodiment, messaging module 315 displays the contact list in a GUI as described above with respect to FIG. 1. On selection of one or more contacts from the ranked contact list, the messaging module 315 provides a user interface with which the user may create a message to send to the selected contact. Alternatively or additionally, the messaging module 315 may provide a user interface for the user to create a message and then select one or more contacts from the ranked contact list to whom the message should be sent.

The contact list store 320 includes one or more computer-readable media configured to store the user's contact list. Although the contact list store 320 is shown as part of the messaging application 112 in FIG. 3, it may be located elsewhere within the client device 110 or remotely from the client device (e.g., as part of the messaging system 130). In one embodiment, the messaging system 130 stores the user's master contact list and the contact list store 320 holds a copy that is periodically (e.g., hourly, daily, etc.) synchronized with the master contact list.

Alternatively, synchronization may occur in response to a triggering event, such as when the messaging application 112 makes a new connection to the messaging system 130 or the user requesting synchronization of the local contacts list.

Figure 4:
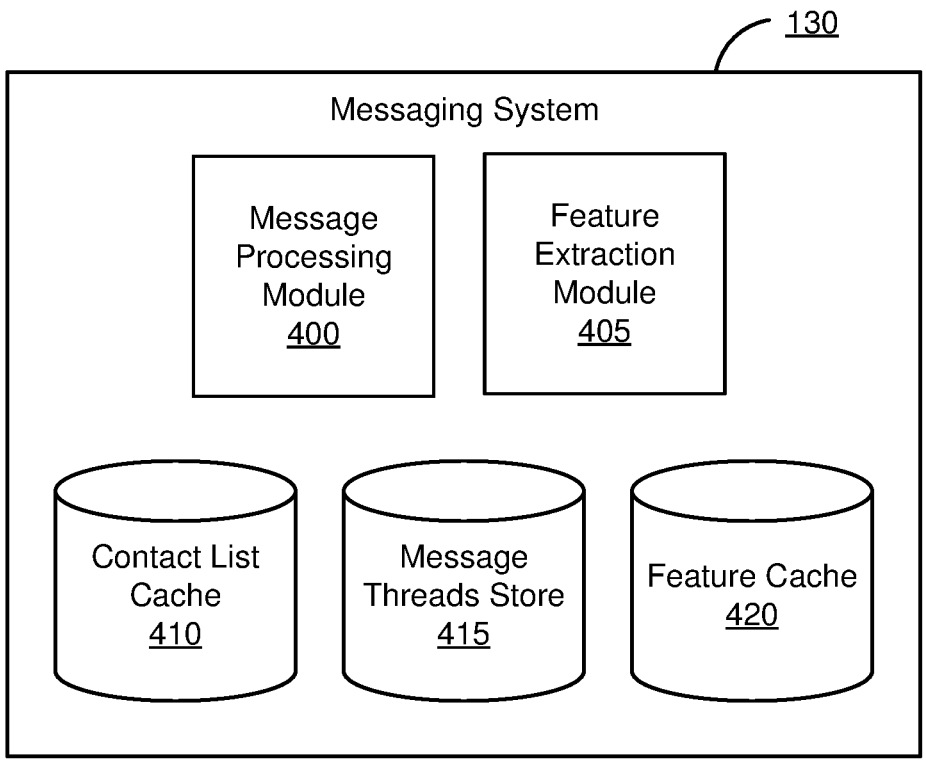
FIG. 4 is a block diagram of an architecture of the messaging system shown in FIG. 1, in accordance with an embodiment.

FIG. 4 is a block diagram of one embodiment of the messaging system 130. In the embodiment shown in FIG. 4. The messaging system 130 includes a message processing module 400, a feature extracting module 405, a contact list cache 410, a message threads store 415, and a feature cache 420. In other embodiments, the messaging system 130 contains different and/or additional elements. In addition, the functions may be distributed among the elements in a different manner than described.

The message processing module 400 receives and processes messages sent by client devices 110. In one embodiment, the message processing module 400 receives a message from a client device 110 of a user that is addressed to one or more of the user's contacts. If the messaging system 130 does not already have a copy of the user's contact list, it may send a request for the user's contacts list to the user's client device 110. Assuming the user's client device 110 provides the contacts list, the message processing module 400 stores a copy (e.g., in the contact list caches).

The message processing module 400 analyzes the message to associate it with a message thread (e.g., stored in the message threads store 415). In one embodiment, the message includes metadata indicating the thread of which it is a part (e.g., a thread ID). Alternatively, the message processing module 400 may identify the thread based on the user who sent the message and the recipients. For example, the messaging system 130 may consider all messages exchanged between a group of two or more users to be a single thread. However the thread is identified, the message processing module 400 adds a copy of the message to the thread. Thus, when the recipient is next connected to the messaging system 130 via a client device 110, a copy of the message may be sent to the recipient's client device. In some embodiments, if the recipient's client device 110 is already connected to the messaging system 130, a copy of the message may be sent before or in parallel with adding the message to reduce lag time between the user sending the message and the recipient receiving it.

The feature extraction module 405 extracts features from message threads (e.g., as stored on the message threads store 415). The features are stored for use by other modules and/or systems (e.g., in the feature cache 420). The feature extraction module 405 may redetermine the features for a thread in response to a new message being added to the thread. Alternatively, the features for a thread nay be extracted periodically (e.g., hourly, daily, etc.).

In one embodiment, the features for a thread include a number a number of messages feature and a number of days alive feature. The feature extraction module 405 determines the number of messages feature by counting the number of messages in the thread sent by any of the participating users. The number may be for the entire history of the thread or a cutoff may be used (e.g., a count of messages sent within the last year). The value for the feature may be the raw message count or may be derived from the raw count. For example, the value may be obtained by normalizing the raw count based on all of the user's threads (e.g., a percentage of the total number of messages included in the user's thread that has the most messages).

The number of days alive feature provides an indication of the consistency of current activity of the thread. In one embodiment, the feature extraction module 405 determines the value of the number of days alive feature by counting the number of days in the last week for which at least one message was added to the thread. For example, if at least one message was sent by one of the participants every day for the last seven days, the value of the number of days alive feature would be seven. In other embodiments, time periods other than days and/or weeks may be used, such as the number of hours in the last day, the number of days in the last month, the number of weeks in the last month, and the like.

In various embodiments, the features extracted by the feature extraction module 405 also include demographic features of the user and the user's contact (or contacts) involved in the thread. These demographic features can include age, location, education level, and the like. In other embodiments, the features may include different and/or additional features than those described above.

The contact list cache 410 includes one or more computer readable media configured to store copies of users' contact lists. The contact lists may be indexed by an identifier of the corresponding user (e.g., a user ID). In one embodiment, the contact list cache 410 stores one or more contact lists for each user of the messaging system 130. Each contact list contains information associated with a set of contacts, where a contact is another user of the messaging system 130. For example, each contact in a contact list may include an identifier uniquely identifying a particular user of a messaging application, such an email address, telephone number, user name, or user ID for the online system 120. The contact lists received and stored by the contact list cache 300 may include only a subset of the information maintained in the contact lists by the messaging applications 112.

Similarly, the message threads store 415 and feature cache 420 include one or more computer readable media configured to store message threads and features extracted from message threads, respectively. The message threads and corresponding features may be indexed by an identifier of the message thread (e.g., a thread ID) and/or identifiers of the users involved in the threads (e.g., user IDs). Although the contact list cache 410, message threads store 415, and feature cache 420 are shown as separate entities, in some embodiments, two or more of them may be stored on a single computer readable medium. Similarly, although depicted as single entities located within the messaging system 130, one or more of the contact list cache 410, message threads store 415, and feature cache 420 may be distributed across multiple devices and accessed via the network 120. For example, the message threads and correspond features might be stored in a distributed database.

Figure 5:
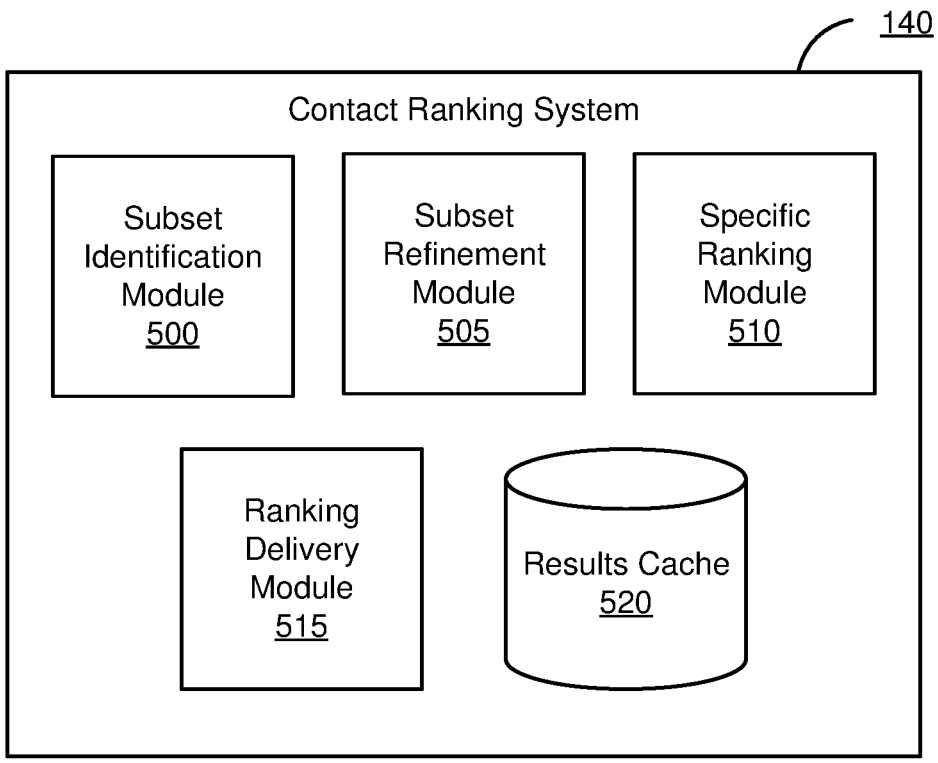
FIG. 5 is a block diagram of an architecture of the contact ranking system shown in FIG. 1, in accordance with an embodiment.

FIG. 5 is a block diagram of one embodiment of the contact ranking system 140. In the embodiment shown in FIG. 4, the contact ranking system 140 includes a subset identification module 500, a subset refinement module 505, a specific ranking module 510, a ranking delivery module 515, and a results cache 520. In other embodiments, the contact ranking system 140 contains different and/or additional elements. In addition, the functions may be distributed among the elements in a different manner than described.

The subset identification module 500 identifies a subset of a user's contacts to be ranked. In one embodiment, the subset identification module 500 generates an activity score for each of the user's contacts. The activity score indicates the likelihood that the user will engage in a highly-active thread with the contact in a given time period (e.g., within the next week). The term "highly-active" refers to a messaging thread that includes a threshold amount of activity. For example, a highly active messaging thread can be a messaging thread having a threshold number of messages exchanged within a particular time period. To illustrate, a highly active messaging thread can include threads that are active for at least four days out of seven and have fifty or more messages within the seven days. The subset identification module may use additional or alternative criteria for determining whether a messaging thread is highly active. The criteria may be tailored to an individual user (e.g., normalized to a total amount of messages the user sends using the messaging application and/or an average number of days per week the user uses the messaging application, etc.).

In one embodiment, the subset identification module 500 calculates the activity score between a user and a contact based on interactions between them. These interactions may include messages exchanged through the messaging system 130, interactions through the online system 120 (e.g., "liking" each other's photographs), and any other identified interaction between the user and the contact in the system environment 100. The subset identification module 500 can generate the activity score by applying a logistic regression to the identified interactions to obtain a number representing the probability that the users will engage in highly active messaging activities. The interactions may be weighted to adjust the effect that the presence and/or absence of certain interactions have on the activity score. Thus, some interactions can influence the activity score more than other interactions. The activity score may be calculated periodically (e.g., daily) or updated continuously in response to interactions between the user and the contact.

Regardless of how the activity scores are calculated, the subset identification module 500 uses them to identify a subset of the user's contacts. In one embodiment, the subset includes a pre-determined number of contacts (e.g., eight hundred) and the subset identification module 500 includes the pre-determined number of contacts with the highest activity scores in the subset (e.g., those most likely to engage in a highly-active messaging thread with the user in the next week). Alternatively, the subset identification module 500 may include any contact that has an activity score above an activity score threshold in the subset. In another embodiment, the subset identification module 500 initially includes all of the user's contacts in the subset.

The subset refinement module 505 takes the subset of contacts produced by the subset identification module 500 and refines it to produce a refined subset that includes fewer contacts. In one embodiment, the subset refinement module 505 applies a global ranking module to rank the subset of contacts and select a given number (e.g., two hundred) of the most highly ranked contacts as the refined subset. The model is global in that it is applied to features generated by the feature extraction module 405 and generates a refined subset of contacts to which context-specific models can be applied to generate ranked lists of contacts for specific purposes. By using features that are already available in the system environment 100, application of the global ranking module may be computationally efficient.

In various embodiments, the global ranking model is a machine-learned model that maps a set of features for a thread generated by the feature extraction module 405 to a likelihood that the thread will be active in a given time period (e.g., the next twenty-four hours). For the purposes of the global ranking model, a thread may be considered active if one or more messages are added during the specified time period. Alternatively, a thread may only be considered active if the number of messages added during the time period exceeds a threshold (e.g., four messages, ten messages, etc.).

To train the global ranking model for a user, the subset refinement module 505 retrieves features (e.g., from the feature cache 420) for threads involving the user and contacts in the subset identified by the subset identification module 500 for a first instance of a given time period (e.g., a given day). The subset refinement module 505 also determines from the message threads (e.g., as stored on the message threads store 415) whether the threads were active in a second instance of the given time period that follows the first instance of the given time period (e.g., the day after the given day). Thus, the subset refinement module 505 has sets of features for threads from the first instance of the time period and ground truth data indicating whether the threads were active during the second instance of the time period.

The subset refinement module 505 trains the global ranking model to map the sets of features of threads for the first instance of the given time period to accurate predictions of whether the threads will be active in the second instance of the given time period (as indicated by the ground truth data). The global ranking model outputs a probability (e.g., a percentage) indicating how likely it is that the thread will be active in the future time period. In one embodiment, the global ranking model is a Gradient Boosted Decision Tree (GBDT) that is trained using backpropagation.

In some embodiments, once trained, the global ranking model is validated by applying it to additional features sets for which the ground truth data (i.e., whether the corresponding threads were active in the relevant time period) is known. The additional features sets may be for additional threads in the first instance of the time period that were not used during training and/or threads during different time periods. For example, in one embodiment, the model is trained to correctly predict which threads will be active on one day and then validated by checking how accurately it predicts whether the same threads are active on a different day (e.g., the next day).

Once the global ranking model has been trained (and optionally validated), the subset refinement module 505 deploys it in conjunction with the other elements of the contact ranking system 140 for use in providing ranked contact lists to requesting applications. In one embodiment, the subset refinement module 505 periodically (e.g., hourly, daily, etc.) applies the trained global ranking model to the subset of a user's contacts generated by the subset identification module 500 to generate probabilities that threads will be active in a future time period (e.g., the next twenty-four hours, etc.). These probabilities may be used as a proxy for how likely it is that the user will interact with the corresponding contacts (in any manner) in the same time period. The subset refinement module 505 may thus refine the subset of the user's contacts to a pre-determined number that are most likely to interact with the user in the future time period or to just those contacts for whom the probability exceeds a refinement threshold. The probabilities and/or refined subset may be stored in the results caches 520. In another embodiment, the global ranking model is applied in response to a request for a ranked list of contacts from an application.

The specific ranking module 510 takes the refined subset of contacts generated by the subset refinement module 505 and ranks the refined subset using a context-specific model. The context-specific model is a machine-learned model that predicts whether the user will interact with a given contact through a particular application and/or in a particular manner. In one embodiment, the specific ranking module 510 identifies the purpose for which the ranked list of contacts is being requested and selects a corresponding context-specific model. For example, the specific ranking module 510 might have a different context-specific model for each application and/or function that uses the contact ranking system 140. The context-specific models may be identified by predetermined model IDs.

In one embodiment, a context-specific model calculate a ranking score for each contact in the refined subset. The ranking score for a contact indicates a likelihood that the user will interact with that contact in the context of the purpose for which the ranked list was requested. For example, the ranking score may indicate the probability of the user interacting with contact with a particular application or function (e.g., one to which the context-specific model corresponds). Because the refined subset may be significantly smaller than the subset identified by the subset identification module 500 (e.g., two to three hundred contacts rather than eight hundred to a thousand), the context-specific models can be computationally more demanding than the general ranking model. The context-specific models may take more features as input (including features that are specific to the corresponding application or function) and/or use features that are computed at the time the ranked list of contacts is requested. Consequently, the output may be a relatively more accurate measure of the true likelihood that the user will interact with a given contact through a particular application or function.

As with the general ranking model, the context-specific ranking models may be trained based on training data derived from actual use of the corresponding applications and functions. For example, in the case of an event planning application, the specific ranking module 510 might apply a context-specific ranking model to predict the likelihood of the user inviting each contact in a refined subset to various events and then compare that to ground truth data indicating which contacts the user actually invited to the events. Backpropagation may then be used to train the context-specific model. The context-specific model may also be validated in a similar manner as the global ranking model.

The ranking delivery module 515 provides the ranked lists of contacts to the requesting applications and/or functions based on the ranking scores generated by the specific ranking module 510. In one embodiment, the ranking delivery module 515 provides the contacts in rank order without providing the specific ranking scores. If the application or function requested a specific number of contacts less than the number for which the specific ranking module 510 calculated a ranking score, the ranking delivery module 515 may filter the contacts based on the ranking scores (e.g., by returning the requested number of contacts that had the highest ranking scores). The ranking delivery module 515 may additionally or alternatively filter the ranked contacts based on other criteria, such as only returning those contacts that are currently active in the messaging system 130. In another embodiment, the ranking delivery module returns contact ranking duples, each duple including an identifier of the contact (e.g., a user ID) and the corresponding ranking score generated by the specific ranking module 510.

The results cache 520 includes one or more computer readable media configured to store results generated by the subset refinement module 505. This may improve the efficiency of the contact ranking system 140 by allowing the results to be reused (e.g., multiple specific ranking models may be applied to a single refined subset generated by a global ranking model).

In one embodiment, the results cache 520 stores identifiers of contacts in the subset (e.g., user IDs) in conjunction with the corresponding probabilities that the user will interact with those contacts generated by the subset refinement module 505. Alternatively, the results cache 520 may store identifiers of the users in the refined subset. One of skill in the art will recognize other data that may be stored and/or other ways in which the data may be stored in the results cache 520 to improve the efficiency of the contact ranking system 140.

Example Computer System

Figure 6:
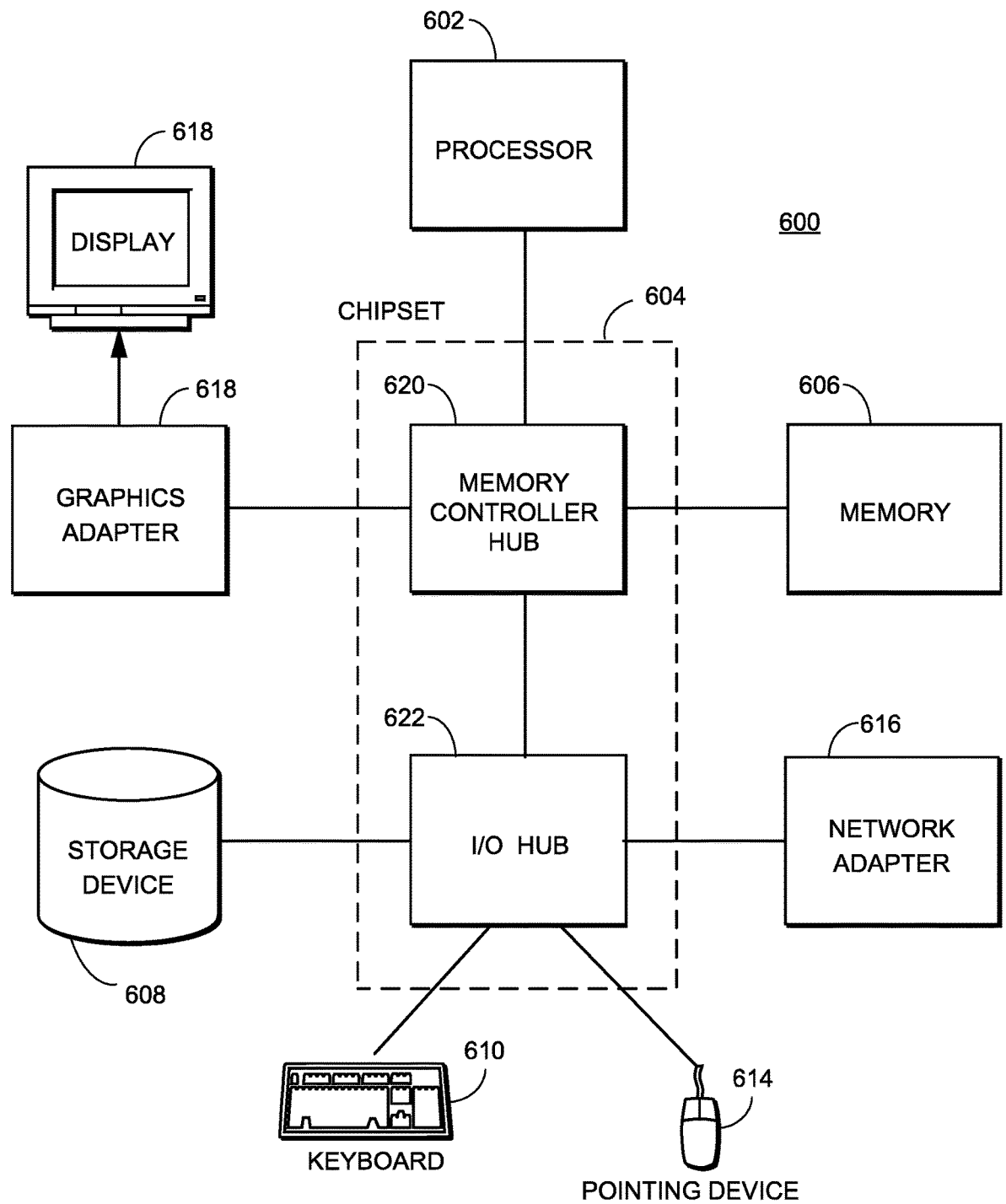
FIG. 6 is a high-level block diagram illustrating physical components of a computer used as part or all of one or more of the entities described herein in one embodiment.

FIG. 6 is a high-level block diagram illustrating physical components of one embodiment of a computer 600 used as part or all of one or more of the entities described herein. For example, instances of the illustrated computer 600 may be used as a server operating the messaging system 130. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network (e.g., network 115).

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Example Contact Ranking Method

Figure 7:
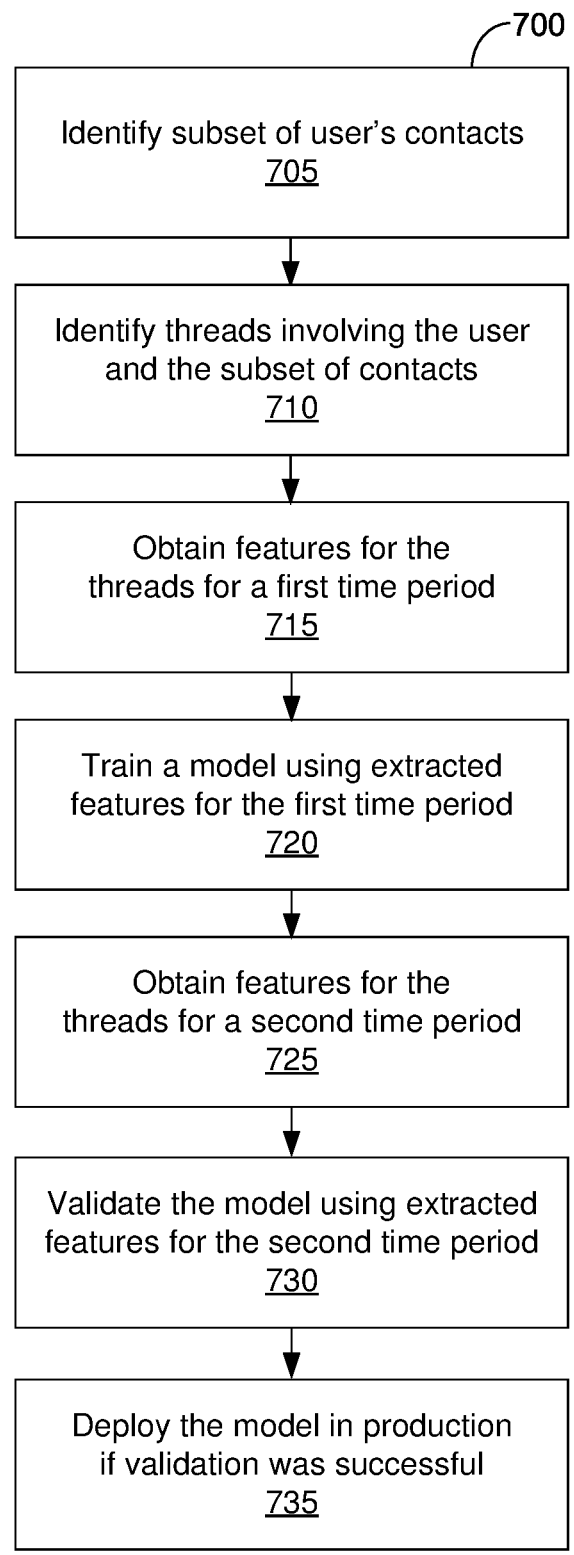
FIG. 7 is a flow chart illustrating a method of training a global ranking model, in accordance with an embodiment

FIG. 7 is a flow chart illustrating one embodiment of a method 700 for training a global ranking model. The steps of FIG. 7 are illustrated from the perspective of the contact ranking system 140 performing the method 700. However, some or all of the steps may be performed by other entities and/or components. In addition, some embodiments may perform the steps in parallel, perform the steps in different orders, or perform different steps.

In the embodiment shown in FIG. 7, the method 700 begins with the subset identification module 500 identifying 705 a subset of the user's contacts. In one embodiment, the subset includes the eight hundred contacts that are predicted to be most likely to interact with the user in the next week. In other embodiments, other numbers of users may be included in the subset and/or the time period for interaction may be different.

The subset refinement module 505 identifies 710 message threads involving the user and the subset of contacts and obtains 715 features for the threads for a first time period. In one embodiment, the user has a single message thread with each contact stored in the message threads store 415. For each thread, the corresponding features (e.g., a number of messages feature, a number of days alive feature, and demographics features) are stored in the feature cache 420. The features may be extracted from the message threads periodically (e.g., daily). The first time period may be one of the periodic feature extraction periods prior to the most recent period (e.g., if the features are extracted daily, the first time period might be the day two days prior to today). Alternatively, some or all of the features may be extracted from the message threads as needed.

The subset refinement module 505 trains 720 a global ranking model using the features for the first time period. In one embodiment, the global ranking model is a GBDT model that maps the features for the first time period (e.g., a given day) for each thread to a corresponding prediction of whether that thread will be active in a future time period (e.g., the day following the given day). The prediction may be a percentage likelihood that the thread will be active in the future time period. The model is trained to minimize differences between the predictions and ground truth data (i.e., whether the threads actually were active in the future time period). For example, the subset refinement module 505 may calculates a cost score by summing the difference between 100% and the actual prediction for each thread that was active in the future time period and the difference between 0% and the actual prediction for each thread that was not active in the future time period. In other words, the predictions are used to generate a measure of accuracy for the model. The subset refinement model adjusts the model (e.g., using backpropagation) to minimize cost score. In other embodiments, other cost scores may be used.

In embodiments where the global ranking model is validated, the subset refinement module 505 obtains 725 features for the threads in a second time period. The global ranking model is validated 730 by comparing the predictions it generates for threads based on the features for the threads in a second time period to ground truth data indicating which threads were actually active. If the predictions are determined to be sufficiently accurate (e.g., if a cost score calculated using the same or a similar approach as used during training 720 is less than a validation threshold) then the global ranking model may be deployed 735 for use (e.g., within the method described below, with reference to FIG. 8). Otherwise, the model may be modified, retrained, and revalidated until a model that is successfully validated 730 is generated. At which point, the model may then be deployed 735 for use.

Figure 8:
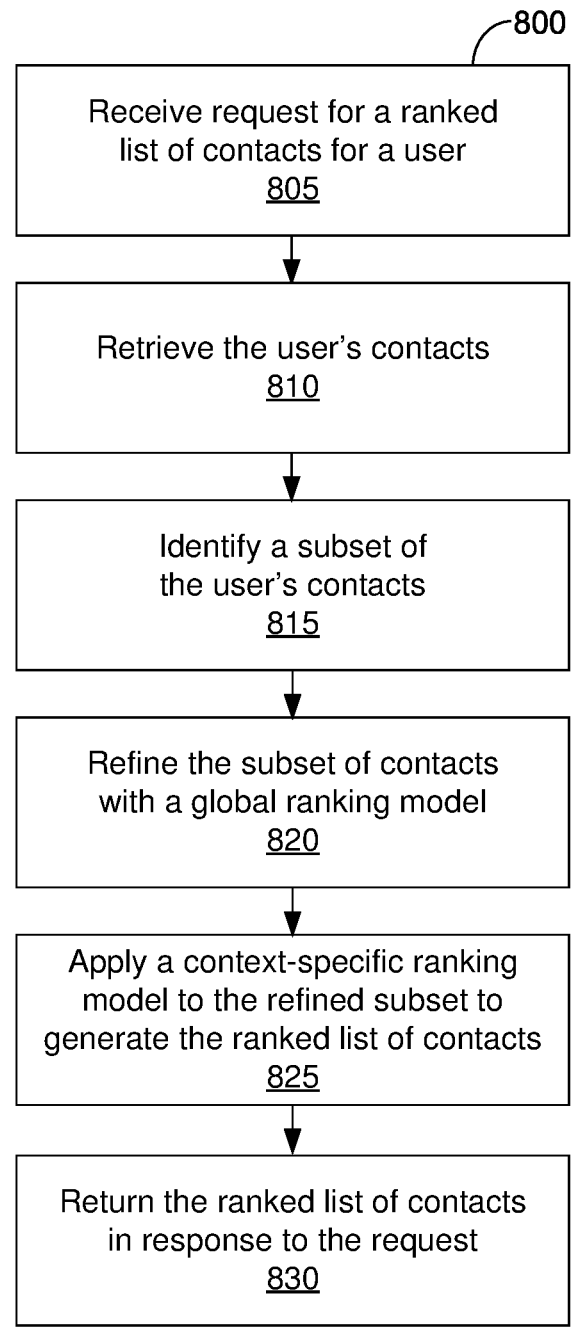
FIG. 8 is a flow chart illustrating a method of providing a ranked list of contacts, in accordance with an embodiment.

FIG. 8 is a flow chart illustrating one embodiment of a method for providing a ranked list of contacts. The steps of FIG. 8 are illustrated from the perspective of the contact ranking system 140 performing the method 800. However, some or all of the steps may be performed by other entities and/or components. In addition, some embodiments may perform the steps in parallel, perform the steps in different orders, or perform different steps.

In the embodiment shown in FIG. 8, the method 800 begins with the contact ranking system 140 receiving 805 a request for a ranked list of contacts for a user. In one embodiment, the request includes an identifier of the user (e.g., a user ID) and an indication of the purpose for the ranked list. The purpose may be indicated by identifying the application or function requesting the ranked list or by specifically identifying a context-specific model that should be used (e.g., with a model ID).

The subset identification module 500 retrieves 810 the user's contacts and identifies 815 a subset of those contacts. In one embodiment, the subset of the user's contacts is a pre-determined number of contacts (e.g., eight hundred) with which the user is most likely to engage in a highly-active messaging thread within the next week. In other embodiments, different sized subsets and different criteria for selecting which contacts are included may be used.

The subset refinement module 505 refines 820 the subset of the user's contacts by applying a global ranking model that is computationally cheap (relative to the context-specific models). As described previously, the global ranking model ranks the contacts in the subset based on probabilities that the user will interact with the contacts in a given time period. In one embodiment, the subset refinement module 505 refines 820 the subset down to a fixed number of contacts (e.g., two hundred) with which the user is most likely to interact within the next day.

The specific ranking module 510 applies 825 a context-specific ranking model to the refined subset of contacts to generate the ranked list of contacts. The context-specific ranking model is computationally more expensive than the global ranking model, but is applied to less of the user's contacts. In one embodiment, the specific ranking module 510 selects a particular context-specific ranking model to apply 825 based on the purpose for the ranked list that was indicated in the request. The selected context-specific ranking model generates a ranking score for each contact in the refined subset. The ranking scores indicate the suitability of the corresponding contact for the particular purpose. For example, if the purpose is selecting a contact to message in the messaging application 112, the ranking score might indicate the likelihood that the user will send a message to that contact.

The ranking delivery module 515 returns 830 the ranked list of contacts in response to the request. The ranked list may just identify the contacts (e.g., by user ID) in rank order or may include the ranking score for each contact. In the latter case, the contacts may be sent in rank order or some other order (in which case, the requesting application or function would sort the contacts based on the ranking scores).

Figure 9:
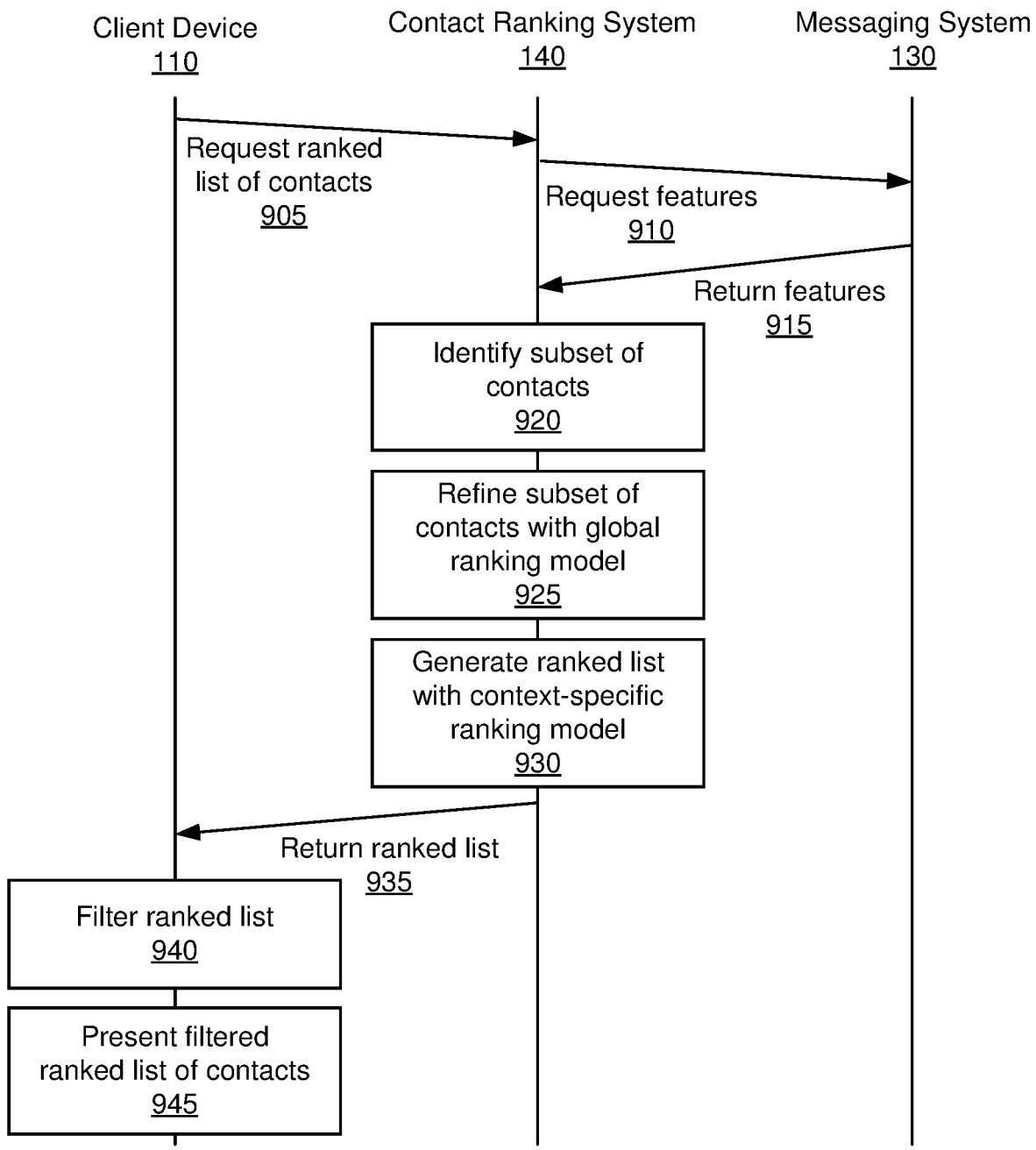
FIG. 9 is a transaction diagram illustrating interactions between a client device, messaging system, and contact ranking system, in accordance with an embodiment.

FIG. 9 is a transaction diagram illustrating interactions between a client device 110, messaging system 130, and contact ranking 140, in accordance with an embodiment. In other embodiments, some or all of the steps may be performed by other entities and/or components. In addition, some embodiments may perform the steps in parallel, perform the steps in different orders, or perform different steps.

In the embodiment shown in FIG. 9, a client device 110 requests 905 a ranked list of contacts from the contact ranking system 140. The contact ranking system 140 sends 910 a request for features to the messaging system 130, which returns 915 the requested features. As described previously, the features may include a number of messages feature, a number of days alive feature, demographics-based features, and the like.

The contacts ranking system 140 identifies 920 a subset of the user's contacts (e.g., as described above with reference to the subset identification module 500), refines 925 the subset using a global ranking model (e.g., as described above with reference to the subset refinement module 505), and generates 930 a ranked list of contacts using a context-specific ranking model (e.g., as described above with reference to the specific ranking module 510). The contact ranking system 140 returns 935 the ranked list to the client device 110.

In the embodiment shown in FIG. 9, the client device 110 filters 940 the ranked list (e.g., to remove those contacts that are not currently active) and presents 945 the filtered ranked list of contacts to a user. For example, in a messaging application 112, those of the user's contacts in the ranked list that are currently active in the messaging application might be displayed in rank order (e.g., with the highest ranked contact that is active at the top). Thus, active users with which the user is most likely to communicate are displayed at the top of the user's contact list. Where screen space is limited (e.g., on a smart phone with a small screen), this may improve the efficiency of the user interaction as the user is less likely to need to scroll down the contacts list to find a particular contact the user wishes to message (or will have to scroll a shorter distance). Similar interface efficiency advantages may be realized in other applications where a user is presented with a list of contacts.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, from a client device associated with a user, a request for a ranked list of contacts of the user, the request identifying a purpose for the ranked list of contacts;
   retrieving a list of the user's contacts from a data store;
   identifying a subset of the user's contacts that are likely to interact with the user in a specified future time period, identifying the subset comprising:
   identifying an initial subset of the user's contacts;
   identifying a message thread associated with a contact in the initial subset;
   obtaining a set of features associated with the message thread;
   applying a machine-learned global ranking model to the set of features to generate a likelihood that the contact will interact with the user in the specified future time period; and
   refining the initial subset to identify the subset based on the likelihood;
   calculating ranking scores for the subset of the user's contacts, each ranking score indicating a probability that the user will interact with a corresponding one of the subset of the user's contacts in a manner consistent with the purpose; and sending the ranked list of contacts to the client device, the ranked list of contacts based on the ranking scores.

2. The method of claim 1, wherein identifying the initial subset of the user's contacts is based on likelihoods that the user's contacts will interact with the user in a second future time period and wherein the specified future time period is a subset of the second future time period.

3. The method of claim 1, wherein the set of features includes a number of messages feature and a number of days alive feature, the number of messages feature indicating a total number of messages in the thread and the number of days alive feature indicating a number of instances of a given time period within a longer time period in which a message was added to the threw and wherein the refining further comprises removing the contact from the subset based on the likelihood for the contact.

4. The method of claim 1, wherein training the global ranking model included:
identifying a set of threads involving the user;
obtaining features for the threads in the set, the features including a number of messages feature and a number of days alive feature, the number of messages feature indicating a total number of messages in the thread and the number of days alive feature indicating a number of instances of a given time period within a longer time period in which a message was added to the thread;
applying the global ranking model to generate predictions of whether the threads will be active in a future time period;
determining a measure of accuracy for the global ranking model by comparing the predictions to ground truth data indicating whether the threads were active in the future time period; and
adjusting the global ranking model based on the measure of accuracy.

5. The method of claim 2, wherein the specified future time period is a day and the second future time period is a week, and the subset is determined daily.

6. The method of claim 1, further comprising selecting a context-specific model based on the purpose for the ranked list of contacts, wherein the context-specific model calculates the ranking scores.

7. The method of claim 6, wherein the context-specific model is a machine learned model that is computationally more expensive than the global ranking model used to identify the subset of the user's contacts.

8. A non-transitory computer-readable storage medium storing computer program instructions executable by a processor to perform operations comprising:
receiving, from a client device associated with a user, a request for a ranked list of contacts of the user, the request identifying a purpose for the ranked list of contacts;
retrieving a list of the user's contacts from a data store;
identifying a subset of the user's contacts that are likely to interact with the user in a specified future time period, the identifying comprising steps:
identifying an initial subset of the user's contacts;
identifying a message thread associated with a contact in the initial subset;
obtaining a set of features associated with the message thread;
applying a machine-learned global ranking model to the set of features to generate a likelihood that the contact will interact with the user in the specified future time period; and
refining the initial subset to identify the subset based on the likelihood;
calculating ranking scores for the subset of the user's contacts, each ranking score indicating a probability that the user will interact with a corresponding one of the subset of the user's contacts in a manner consistent with the purpose; and
sending the ranked list of contacts to the client device, the ranked list of contacts based on the ranking scores.

9. The non-transitory computer-readable storage medium of claim 8, wherein identifying the initial subset of the user's contacts is based on likelihoods that the user's contacts will interact with the user in a second future time period and wherein the specified future time period being is a subset of the second future time period.

10. The non-transitory computer-readable storage medium of claim 8, wherein the set of features includes a number of messages feature and a number of days alive feature, the number of messages feature indicating a total number of messages in the thread and the number of days alive feature indicating a number of instances of a given time period within a longer time period in which a message was added to the thread;
and wherein the refining further comprises removing the contact from the subset based on the likelihood for the contact.

11. The non-transitory computer-readable storage medium of claim 8, wherein machine-learned model, and training the global ranking model included:
identifying a set of threads involving the user;
obtaining features for the threads in the set, the features including a number of messages feature and a number of days alive feature, the number of messages feature indicating a total number of messages in the thread and the number of days alive feature indicating a number of instances of a given time period within a longer time period in which a message was added to the thread;
applying the global ranking model to generate predictions of whether the threads will be active in a future time period;
determining a measure of accuracy for the global ranking model by comparing the predictions to ground truth data indicating whether the threads were active in the future time period; and
adjusting the global ranking model based on the measure of accuracy.

12. The non-transitory computer-readable storage medium of claim 9, wherein the specified future time period is a day and the second future time period is a week, and the subset is determined daily.

13. The non-transitory computer-readable storage medium of claim 8, wherein the operations further comprise selecting a context-specific model based on the purpose for the ranked list of contacts, wherein the context-specific model calculates the ranking scores.

14. The non-transitory computer-readable storage medium of claim 13, wherein the context-specific model is a machine learned model that is computationally more expensive than the global ranking model used to identify the subset of the user's contacts.

15. A system comprising:
a computer processor for executing computer program instructions; and
a non-transitory computer-readable storage medium storing computer program instructions executable by the processor to perform operations comprising:
  receiving, from a client device associated with a user, a request for a ranked list of contacts of the user, the request identifying a purpose for the ranked list of contacts;
  retrieving a list of the user's contacts from a data store;
  identifying a subset of the user's contacts that are likely to interact with the user in a specified future time period, the identifying comprising steps:
  identifying an initial subset of the user's contacts;
  identifying a message thread associated with a contact in the initial subset;
  obtaining a set of features associated with the message thread;
  applying a machine-learned global ranking model to the set of features to generate a likelihood that the contact will interact with the user in the specified future time period; and
  refining the initial subset to identify the subset based on the likelihood;
  calculating ranking scores for the subset of the user's contacts, each ranking score indicating a probability that the user will interact with a corresponding one of the subset of the user's contacts in a manner consistent with the purpose; and
  sending the ranked list of contacts to the client device, the ranked list of contacts based on the ranking scores.

16. The system of claim 15, wherein
identifying the initial subset of the user's contacts is based on likelihoods that the user's contacts will interact with the user in a second future time period and wherein the specified future time period being is a subset of the second future time period.

17. The system of claim 15, wherein
the set of features includes a number of messages feature and a number of days alive feature, the number of messages feature indicating a total number of messages in the thread and the number of days alive feature indicating a number of instances of a given time period within a longer time period in which a message was added to the thread;
and wherein the refining further comprises removing the contact from the subset based on the likelihood for the contact.

18. The system of claim 15, wherein training the global ranking model included:
  identifying a set of threads involving the user;
  obtaining features for the threads in the set, the features including a number of messages feature and a number of days alive feature, the number of messages feature indicating a total number of messages in the thread and the number of days alive feature indicating a number of instances of a given time period within a longer time period in which a message was added to the thread;
  applying the global ranking model to generate predictions of whether the threads will be active in a future time period;
  determining a measure of accuracy for the global ranking model by comparing the predictions to ground truth data indicating whether the threads were active in the future time period; and
  adjusting the global ranking model based on the measure of accuracy.

19. The system of claim 16, wherein the specified future time period is a day and the second future time period is a week, and the subset is determined daily.

20. The system of claim 15, wherein the operations further comprise selecting a context-specific model based on the purpose for the ranked list of contacts, the context-specific model being a machine learned model that is computationally more expensive than a global ranking model used to identify the subset of the user's contacts, wherein the context-specific model calculates the ranking scores.

* * * * *

UNITED STATES PATENT AND TRADEMARK OFFICE
CERTIFICATE OF CORRECTION

PATENT NO. : 11,113,617 B1
APPLICATION NO. : 16/003260
DATED : September 7, 2021
INVENTOR(S) : Xiangyang Liu It is certified that error appears in the above-identified patent and that said Letters Patent is hereby corrected as shown below:

In the Claims

In Column 19, Claim 3, Line 16, delete "threw and" and insert -- thread and --, therefor.

In Column 20, Claim 11, Line 35, delete "wherein machine-learned model, and training the global" and insert -- wherein training the global --, therefor.

Signed and Sealed this
Twenty-fifth Day of October, 2022

Katherine Kelly Vidal
*Director of the United States Patent and Trademark Office*